Dec. 15, 1931.  F. K. FILDES  1,836,158
TRAILER
Filed May 15, 1931  4 Sheets-Sheet 1
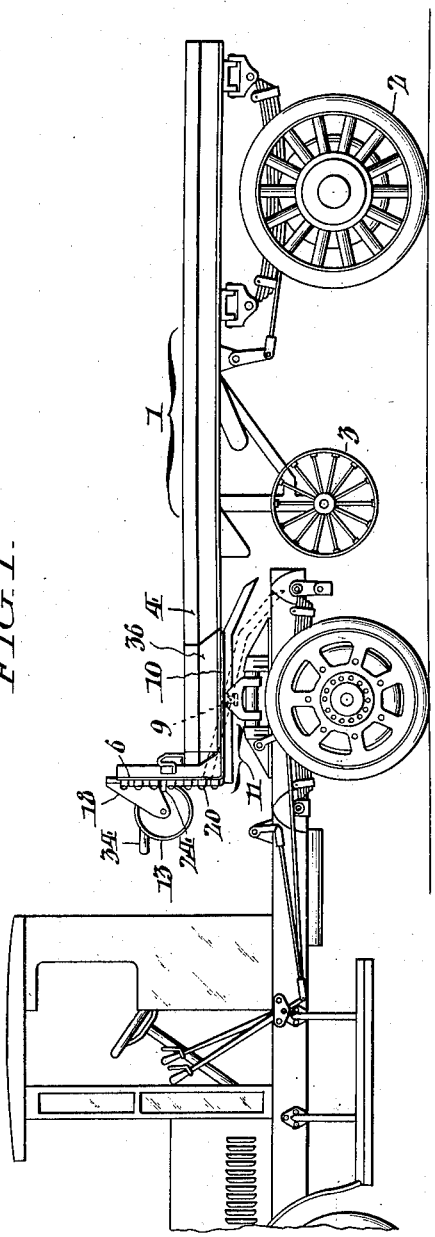
FIG. I.
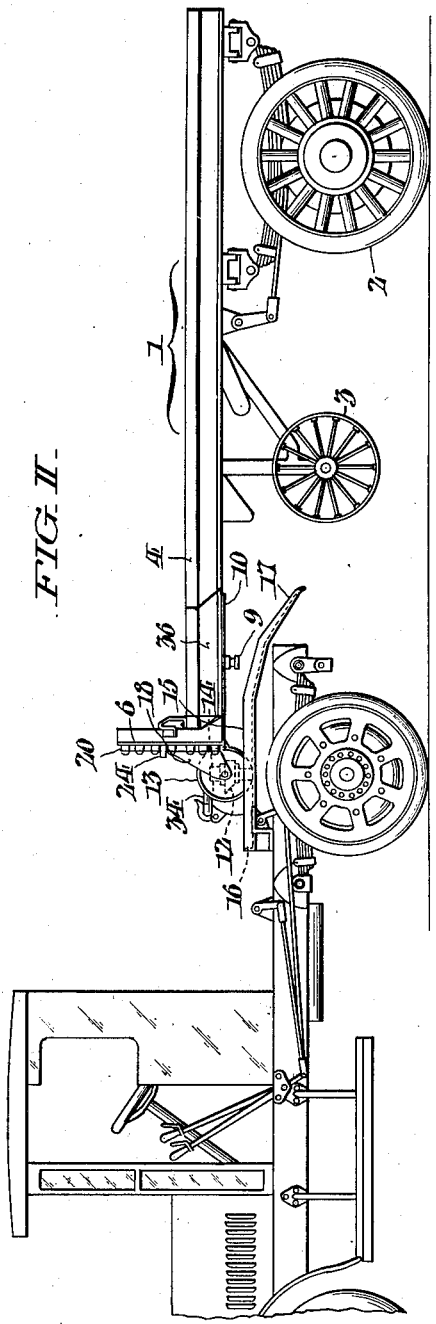
FIG. II.
WITNESSES
Thomas W. Kerr Jr.
William Bell Jr.
INVENTOR:
Frederick K. Fildes,
BY
ATTORNEYS.

Dec. 15, 1931. F. K. FILDES 1,836,158
TRAILER
Filed May 15, 1931 4 Sheets-Sheet 2
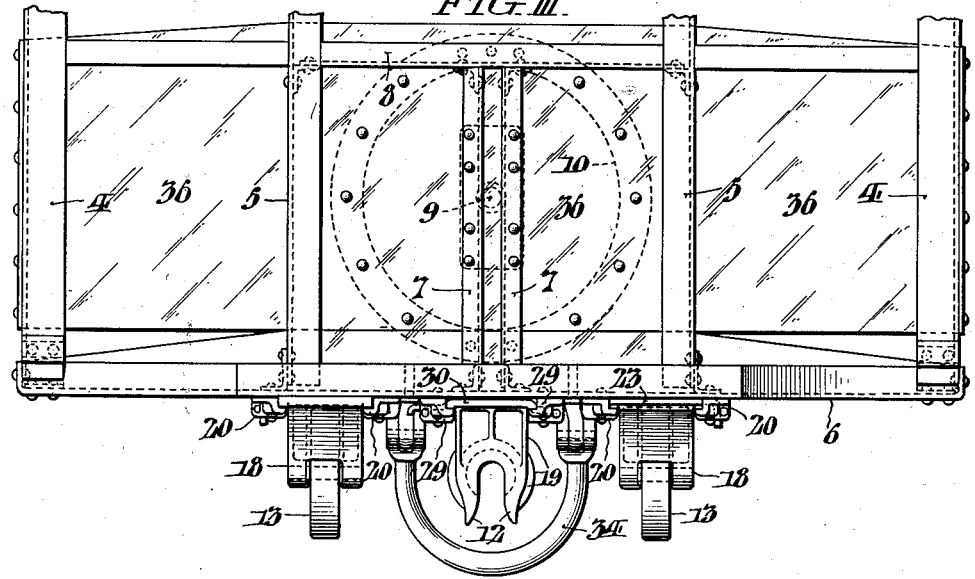
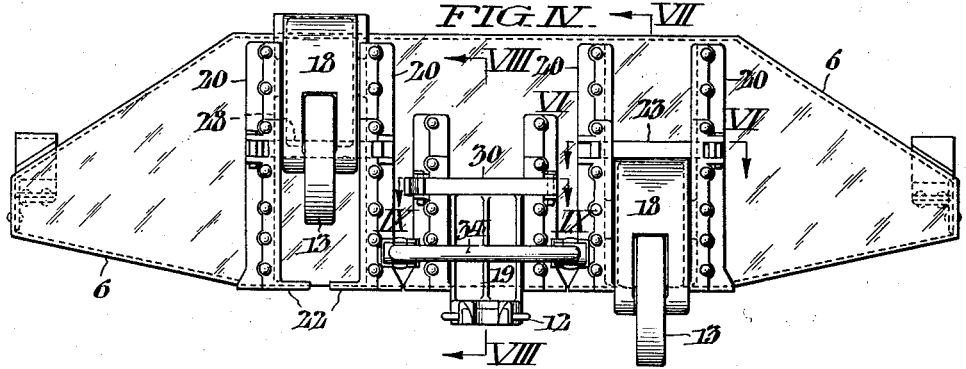
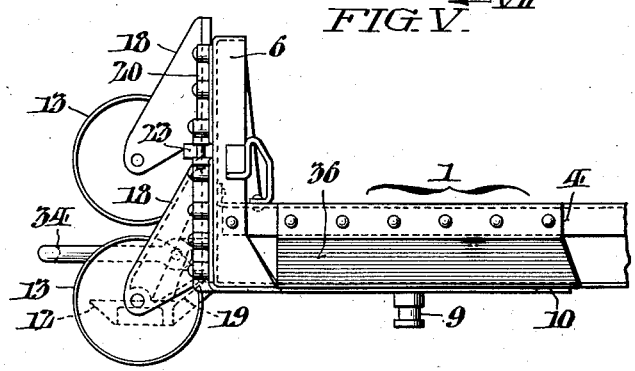
INVENTOR:
Frederick K Fildes
BY
ATTORNEYS.

Dec. 15, 1931.   F. K. FILDES   1,836,158
TRAILER
Filed May 15, 1931   4 Sheets-Sheet 3
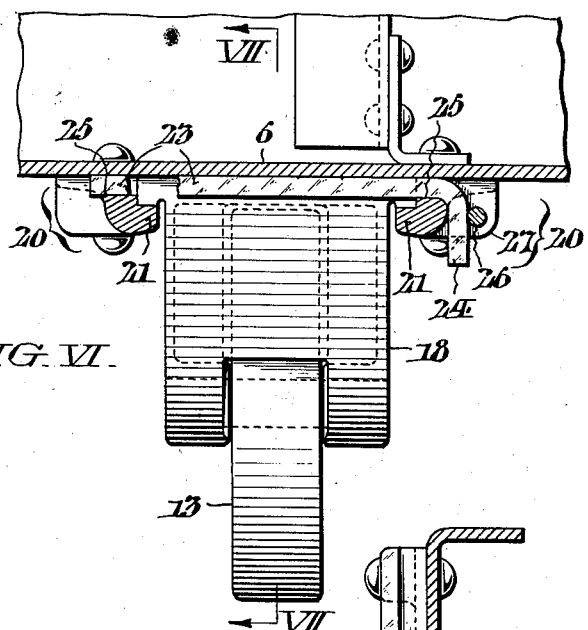
FIG. VI.
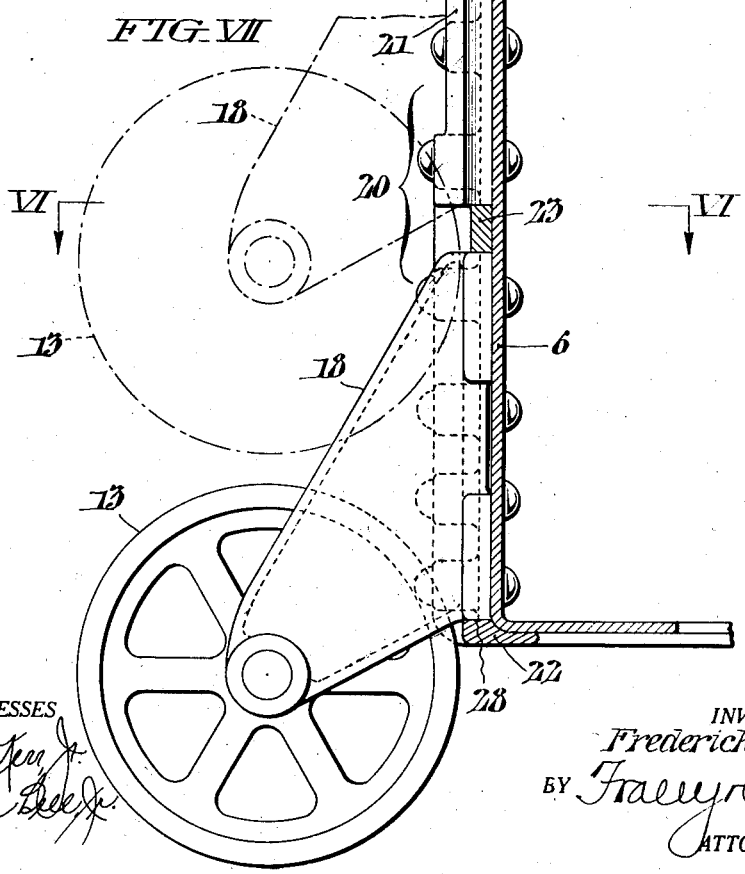
FIG. VII.
WITNESSES
INVENTOR:
Frederick K. Fildes,
BY
ATTORNEYS.

Dec. 15, 1931.   F. K. FILDES   1,836,158
TRAILER
Filed May 15, 1931    4 Sheets-Sheet 4
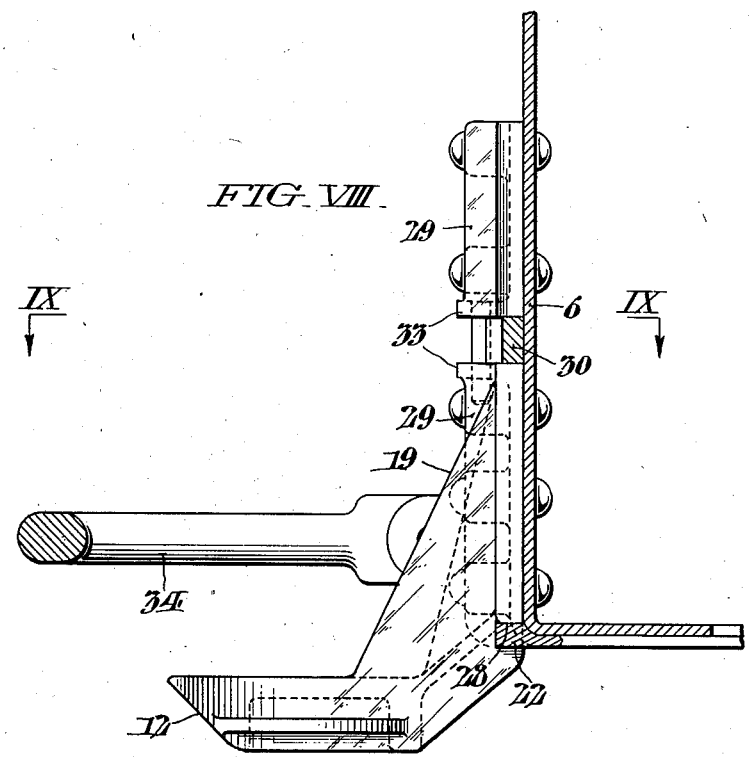
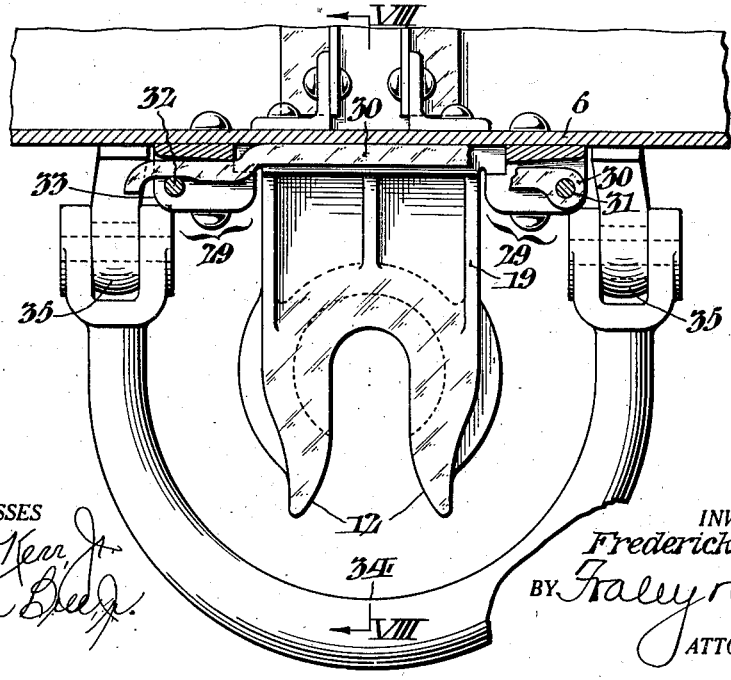

Patented Dec. 15, 1931

1,836,158

UNITED STATES PATENT OFFICE

FREDERICK K. FILDES, OF ALTOONA, PENNSYLVANIA

TRAILER

Application filed May 15, 1931. Serial No. 537,524.

This invention relates to trailers and more particularly to vehicles commonly called "semi-trailers", such vehicles having a pair of rear wheels which engage the ground at all times, and having means whereby the front part of the frame may be superimposed upon the rear part of a tractor and connected thereto by a swivel coupling. Such vehicles are also commonly provided with a pair of front wheels which engage the ground when the semi-trailer is disconnected from the tractor, so that the semi-trailer becomes self-supporting, and which are lifted off the ground when the front part of the semi-trailer is mounted upon the rear part of the tractor.

Heretofore several different types of tractor-trailer coupling attachments have been employed. For example, some semi-trailers are fitted with a forked coupler which extends forwardly from the end of the semi-trailer and which is adapted to engage a king pin on the tractor in coupling relation; and such semi-trailers may also have rollers disposed at each side of the coupler, these rollers being adapted to support the weight of the trailer upon a turn table on the rear end of the tractor. Such a semi-trailer is disclosed in U. S. Patent No. 1,548,967 to S. B. Winn, granted August 11, 1925. Other semi-trailers are fitted with coupling attachments on the underside of the frame near the end thereof, and to effect the coupling between trailer and truck, the trailer is adapted to slide forward upon an inclined plane at the rear of the truck and to be locked thereon in a manner which permits the trailer frame to pivot freely about the tractor. With either of the above mentioned types of tractor-trailer couplings, commonly called "fifth wheel" couplings, special equipment must be provided on the tractor to complement the equipment on the trailer, and heretofore it has been necessary to pair trailers having one type of fifth wheel coupling only with tractors having the same type of fifth wheel coupling, it being impossible to interchange trailers of one type with trailers of another type.

The object of the present invention is to provide a combination trailer unit whereby the trailer may be used with more than one type of tractor. Thus in a trucking system in which tractor-trailer combinations of more than one type of fifth wheel coupling are used, it becomes possible to interchange trailers and tractors so that the fleet of vehicles becomes a homogeneous fleet, any tractor of which may be used with any trailer.

The more specific objects and advantages which characterize this invention will become more apparent from the description which follows hereinafter and which has reference to the accompanying drawings, wherein I have illustrated one embodiment or example of the invention. Of the drawings:

Fig. I represents a side elevation of a semi-trailer combined with one type of tractor.

Fig. II represents a side elevation of the same semi-trailer combined with another type of tractor.

Fig. III represents an enlarged plan view of the front end of the semi-trailer shown in Figs. I and II.

Fig. IV represents an enlarged end elevation of the same.

Fig. V represents an enlarged side elevation of the same.

Fig. VI represents a detailed view of a roller movably supported on the front end of the semi-trailer, the same being a cross-section taken as indicated by the lines VI—VI of Figs. IV and VII.

Fig. VII represents an enlarged cross-section, taken as indicated by the lines VII—VII of Figs. IV and VI.

Fig. VIII represents an enlarged cross-section, taken as indicated by the lines VIII—VIII of Figs. IV and IX, showing a movably supported coupling attachment on the front end of the semi-trailer; and, Fig. IX represents an enlarged cross-section of the same, taken as indicated by the lines IX—IX of Figs. IV and VIII.

The semi-trailer shown in the drawings comprises generally a frame or chassis 1, a pair of rear wheels 2, which are adapted to engage the ground at all times, and a pair of front wheels 3 which, as shown in Figs. I and II, are lifted off the ground when the vehicle is mounted upon a tractor. The frame 1 includes side sills 4, intermediate longitudinal sills 5 and end sills 6. At the front end of the frame there is also a pair of comparatively short central beams 7, the front ends of which are secured to the end sill 6 and the rear ends of which are secured to a transverse beam 8. On the central beams 7 there is mounted a center pin 9 which projects vertically downward from the underside of the frame 1 of the semi-trailer as shown in Fig. V. Concentric with the center pin 9 there is an annular plate 10 which is secured to the underside of a transverse flat plate 36 extending from one side sill 4 to the other. The annular plate 10 serves as a fifth wheel wearing plate when the semi-trailer is coupled to a tractor, as shown in Fig. I.

The attachments comprising the center pin 9 and wearing plate 10 form parts of a tractor-trailer coupling known as the Fruehauf fifth wheel coupling. A description of the complete coupling may be found, for example, in U. S. Patent No. 1,351,245, granted to Ernest F. Hartwick, August 31, 1920.

The fifth wheel supporting table is mounted on the rear of the truck as indicated at 11. When the tractor is disconnected from the semi-trailer, this table 11 tilts downward to the rear, as indicated in dotted lines in Fig. I. To effect the coupling the tractor is backed beneath the semi-trailer frame 1 until the center pin 9 has assumed a position in the center of the fifth wheel and the fifth wheel table has assumed a horizontal position. The coupling is then locked and the semi-trailer is free to pivot about the fifth wheel table. The connection between tractor and semi-trailer is, therefore, a swivel coupling permitting the rear wheels 2 of the semi-trailer to follow a course independent of that taken by the wheels of the tractor.

On the front end sill 6 of the semi-trailer, a different form of swivel coupling attachment is mounted. This attachment has the characteristics of the so-called Lapeer fifth wheel coupling, but the parts thereof are independently slidable in a vertical direction on the end sill, and are provided with means for locking them in alternative positions. This coupling attachment comprises generally a jaw or coupler 12 and rollers 13. The coupler 12 is designed to engage a king pin 14 on the rear of the tractor, as shown in Fig. II, and to be locked thereto in a manner permitting the semi-trailer frame to pivot freely about the king pin 14. The weight of the semi-trailer frame 1 is carried on a platform 15 on the rear of the tractor, this platform including a circular track 16 engaged by the rollers 13. The coupling is effected by backing the tractor under the semi-trailer, the rearwardly and downwardly inclined tracks 17 of the platform 15 engaging the trailer rollers 13. When the rollers 13 have run up the inclined tracks 17 onto the circular track 16, the jaw or coupler 12 is locked to the king pin 14 in which position the rollers 13 are maintained in engagement with the circular track and form a swivel coupling permitting the rear wheels 2 of the semi-trailer to follow a course independent of that taken by the wheels of the tractor. The nature of the tractor apparatus which complements the attachment on the semi-trailer to form the complete coupling is shown in U. S. Patent to Sidney B. Winn, No. 1,548,969, granted August 11, 1925, and forms no part of my invention.

The means by which the rollers 13 and coupler 12 are movably mounted on the front end sill 6 of the semi-trailer comprise brackets 18 and 19. The rollers 13 are mounted, one on each side of the coupler 12, upon the brackets 18. As shown in Fig. VI the side edges of each bracket 18 are engaged within a pair of guide members 20 which have inturned projections 21, the guide members being riveted to the upstanding wall at the front of the end sill 6. At their bottom ends the guide members 20 are so formed at 22 as to close the ends of the grooves within which the side edges of the brackets 18 slide. Accordingly, the roller bracket 18, shown at the right hand of Fig. IV, is at the limit of its downward movement. This bracket is locked against upward movement by means of a key 23 in the shape of a flat bar with one end turned to a right-angle at 24. The key 23 passes through a slot 25 in the guide members 20 immediately above the bracket 18. The turned end 24 of the key 23 engages a pin 26 which is inserted within perforated projections 27. Accordingly, the key 23 is retained in place against shifting in the direction of its length.

The roller bracket 18, shown at the left hand of Fig. IV, has been raised to clear the bottom of the frame 1. In this position the key 23 is passed through slots 25 in the guide members 20 immediately beneath the bottom ledge 28 of the roller bracket 18, and the turned end 24 of the key 23 is engaged by the pin 26 and retained in place. To raise a roller bracket 18 from the position shown at the right hand of Fig. IV to the position shown at the left hand of Fig. IV, it is merely necessary to remove the key 23 and to slide the bracket upward within the guide members 20 to the desired position, whereat the key 23 is again inserted within the slot 25 and serves to engage the bottom ledge 28 and maintain the roller bracket 18 in its elevated position.

The coupler 12, as shown in detail in Figs. VIII and IX, is formed integral with a bracket 19, the side edges of which are engaged within a pair of guide members 29. The coupler bracket 19 is shown in Fig. IV at the limit of its downward movement. It is restrained against upward movement by means of a pivoted pin 30, which is hinged to one of the guide members 29 at 31. The opposite end of the pivoted pin is held in place by a small pin 32 inserted within the perforated projections 33 on the corresponding guide member 29. The pivoted pin 30 engages the top of the bracket 19. When it is desired to elevate the bracket 19 so that the coupler 12 is clear of the bottom of the semi-trailer frame 1, the pivoted pin 30 is swung about its hinge 31, and the bracket 19 is then slid upward within the guide members 29 to the desired position, whereat the pin 30 is swung back to its original position and locked by means of the smaller pin 32. In this position the pivoted pin 30 passes beneath the coupler 12 and prevents its downward movement. Associated with the coupler 12 there is shown a semi-circular bail 34 which is permanently attached to the front end sill 6 by means of fixed pivotal connections 35. The bail 34 forms an auxiliary coupling and is part of the so-called Lapeer fifth wheel coupling apparatus.

From the above description it will be apparent that the semi-trailer of my invention is provided with a combination coupling unit. When the coupling attachment, which is mounted on the front end sill 6, is to be used, the rollers 13 and the coupler 12 are locked in the depressed position. The coupling with the tractor equipment can then be effected, as shown in Fig. II, by backing the tractor in such manner that the rollers run up the inclined tracks 17. When, however, the tractor available is one having equipment which is complementary to the Fruehauf coupling attachment on the semi-trailer, the rollers 13 and the coupler 12 are raised to their elevated positions, in the manner before described, so that the tractor may have unobstructed access to the center pin 9 and the fifth wheel wearing plate 10, and the coupling is effected in the manner hereinbefore described.

While I have described two particular forms of fifth wheel swivel couplings, it will be apparent that the particular devices forming that part of the coupling equipment which is disposed on the semi-trailer may be varied to considerable extent without departing from the spirit of my invention. It will also be apparent that other changes may be made in the form of the apparatus described, which changes come within the claims which are hereto annexed.

Having thus described my invention, I claim:

1. In a trailer, a frame, means on the underside thereof affording parts of a swivel coupling by which said frame may be pivotally attached to a tractor, and additional means at the end of said frame affording parts of a second swivel coupling, said latter means being movably mounted on said frame to permit unobstructed access by the tractor to said first mentioned means.

2. In a trailer, a frame, a tractor-trailer coupling attachment on the underside thereof, and a second tractor-trailer coupling attachment at the end of said frame, said latter attachment having capacity for vertical adjustment to permit unobstructed access by a tractor to said first mentioned attachment.

3. In a trailer, a frame, a tractor-trailer coupling attachment on the underside thereof, a second tractor-trailer coupling attachment at the end of said frame, and rollers disposed at each side of said latter attachment, said rollers being movably mounted on said frame to permit unobstructed access by a tractor to said first mentioned attachment.

4. In a trailer, a frame, a center pin beneath said frame affording a point of pivotal attachment to a tractor, and a coupler at the end of said frame, affording a second point of pivotal attachment to a tractor, said coupler being movably mounted on said frame to permit unobstructed access by the tractor to said center pin.

5. In a trailer, a frame, a center pin beneath said frame affording a point of pivotal attachment to a tractor, a coupler at the end of said frame affording a second point of pivotal attachment, and rollers disposed at each side of said coupler, said rollers being movably mounted on said frame to permit unobstructed access by the tractor to said center pin.

6. In a trailer, a frame, a center pin beneath said frame affording a point of pivotal attachment to a tractor, a coupler at the end of said frame affording a second point of pivotal attachment, and rollers disposed at each side of said coupler, said coupler and rollers being movably mounted on said frame to permit unobstructed access by the tractor to said center pin.

7. In a trailer, a frame, a tractor-trailer coupling attachment on the end of said frame, and roller carrying brackets disposed adjacent to said attachment, the rollers on said brackets normally extending beneath said frame, and said brackets being slidable on the frame whereby the rollers may be elevated to clear the bottom of the frame.

8. In a trailer, a frame, a tractor-trailer coupling attachment on the end of said frame, guide members disposed on each side of said coupling attachment, and roller carrying brackets slidable in said guide members, and means for locking said brackets in alternative positions whereby the rollers may be extended beneath the frame or elevated to clear the bottom of the frame.

9. In a trailer, a frame, a tractor-trailer coupling attachment on the end of said frame, and a bracket carrying said attachment, said bracket being vertically adjustable whereby the coupling may alternatively be extended beneath the frame or elevated to clear the bottom of the frame.

10. In a trailer, a frame, guide members on the end of said frame, a tractor-trailer coupling attachment slidable in said guide members, and means for locking said coupling attachment in alternative positions whereby the coupling attachment may be extended beneath the frame or elevated to clear the bottom of the frame.

11. In a trailer, a frame, a tractor-trailer swivel coupling unit mounted at the end of said frame, said unit comprising rollers adapted to bear upon the tractor, a coupler affording a point of pivotal attachment of the frame on said tractor, and means whereby said coupler and said rollers may be locked alternatively in positions beneath the frame or in positions clear of the bottom of the frame.

12. In a trailer, a frame, a tractor-trailer swivel coupling unit mounted at the end of said frame, said unit comprising rollers adapted to bear upon the tractor, a coupler affording a point of pivotal attachment of the frame on said tractor, and said rollers and coupler being independently slidable on said frame whereby they may be extended beneath the frame or raised to positions clear of the bottom of the frame.

13. In a trailer, a frame, a tractor-trailer coupling attachment on the under side thereof, an additional tractor-trailer coupling unit mounted at the end of said frame, said unit comprising rollers adapted to bear upon the tractor, and a coupler affording a point of pivotal attachment of the frame on said tractor, and means whereby said coupler and said rollers may be locked alternatively in positions beneath the frame or in positions clear of the bottom of the frame.

In testimony whereof, I have hereunto signed my name at Altoona, Pennsylvania, this 28th day of April, 1931.

FREDERICK K. FILDES.